US011303989B2

United States Patent
Gong et al.

(10) Patent No.: US 11,303,989 B2
(45) Date of Patent: Apr. 12, 2022

(54) EARPHONE-SWITCHING METHOD AND MOBILE TERMINAL

(71) Applicant: GUANGDONG OPPO MOBILE TELECOMMUNICATIONS CORP., LTD., Guangdong (CN)

(72) Inventors: Jinhua Gong, Guangdong (CN); Baoti Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/158,616

(22) Filed: Jan. 26, 2021

(65) Prior Publication Data
US 2021/0152918 A1 May 20, 2021

Related U.S. Application Data

(63) Continuation of application No. PCT/CN2019/088165, filed on May 23, 2019.

(30) Foreign Application Priority Data

Jul. 27, 2018 (CN) .......................... 201810844332.6

(51) Int. Cl.
*H04R 1/10* (2006.01)
*H04M 1/72409* (2021.01)
(Continued)

(52) U.S. Cl.
CPC .......... *H04R 1/1041* (2013.01); *H04M 1/026* (2013.01); *H04M 1/72409* (2021.01);
(Continued)

(58) Field of Classification Search
CPC ....................................................... H04R 1/10
See application file for complete search history.

(56) References Cited

U.S. PATENT DOCUMENTS 10,085,216 B1\* 9/2018 Younis .............. H04W 52/0251
10,104,461 B2\* 10/2018 Lee ...................... H04R 1/1041
(Continued)

FOREIGN PATENT DOCUMENTS

CN        107393544 A     11/2017
CN        107872584 A      4/2018
(Continued)

OTHER PUBLICATIONS

International Search Report with English Translation for International application No. PCT/CN2019/088165, dated Aug. 1, 2019 (13 pages).
(Continued)

*Primary Examiner* — Olisa Anwah
(74) *Attorney, Agent, or Firm* — Young Basile Hanlon & MacFarlane, P.C.

(57) ABSTRACT

An earphone-switching method in a mobile terminal are disclosed. The mobile terminal is currently connected with a first earphone, and the method includes performing an earphone-switching operation in response to the mobile terminal being in a call state and an earphone-switching condition being met, the earphone-switching operation being configured for switching the first earphone to a second earphone; detecting whether at least one of a first voice data and a second voice data is obtained during the earphone-switching operation; and sending the at least one of the first voice data and the second voice data, in response to the at least one of the first voice data and the second voice data being obtained, wherein the first voice data is sent to the second earphone, and the second voice data is sent to the peer terminal.

18 Claims, 7 Drawing Sheets

(51) Int. Cl.
*H04M 1/72454* (2021.01)
*H04M 1/02* (2006.01)

(52) U.S. Cl.
CPC ..... *H04M 1/72454* (2021.01); *H04R 2420/03* (2013.01); *H04R 2420/05* (2013.01); *H04R 2420/07* (2013.01)

(56) References Cited

U.S. PATENT DOCUMENTS

| | | | |
|---|---|---|---|
| 10,412,494 B2* | 9/2019 | Tong | H04W 4/80 |
| 10,631,363 B1* | 4/2020 | Xian | H04R 1/1016 |
| 2008/0139212 A1 | 6/2008 | Chen et al. | |
| 2010/0020982 A1 | 1/2010 | Brown et al. | |
| 2012/0230510 A1* | 9/2012 | Dinescu | H04R 5/033 |
| | | | 381/80 |
| 2013/0316642 A1 | 11/2013 | Newham | |
| 2016/0219358 A1* | 7/2016 | Shaffer | H04R 1/1041 |
| 2017/0264987 A1* | 9/2017 | Hong | H04R 1/1025 |
| 2017/0311105 A1* | 10/2017 | Hariharan | H04R 1/1041 |
| 2018/0035246 A1* | 2/2018 | Orescanin | H04L 65/605 |
| 2018/0199282 A1* | 7/2018 | Newham | H04R 1/1091 |
| 2019/0230459 A1* | 7/2019 | Sridharan | H04R 5/033 |
| 2020/0252993 A1* | 8/2020 | Srivastava | H04W 4/80 |
| 2021/0045191 A1* | 2/2021 | Hsieh | H04R 5/033 |

FOREIGN PATENT DOCUMENTS

| | | |
|---|---|---|
| CN | 107885478 A | 4/2018 |
| CN | 107894881 A | 4/2018 |
| CN | 109041142 A | 12/2018 |

OTHER PUBLICATIONS

First Office Action from China patent office with English Translation in a counterpart Chinese patent Application 201810844332.6, dated Sep. 8, 2019 (9 pages).
Second Office Action from China patent office with English Translation in a counterpart Chinese patent Application 201810844332.6, dated Nov. 9, 2019 (8 pages).
Rejection decision from China patent office with English Translation in a counterpad Chinese patent Application 201810844332.6, dated Jul. 1, 2020 (10 pages).
Extended European Search Report for EP Application 19840890.8 dated Aug. 19, 2021. (11 pages).

* cited by examiner

EARPHONE-SWITCHING METHOD AND MOBILE TERMINAL

CROSS-REFERENCE TO RELATED APPLICATION(S)

The present disclosure is a continuation-application of International (PCT) Patent Application No. PCT/CN2019/088165, filed on May 23, 2019, which claims foreign priority of Chinese Patent Application No. 201810844332.6, filed on Jul. 27, 2018, the entire contents of both of which are hereby incorporated by reference.

TECHNICAL FIELD

The present disclosure relates to the field of mobile terminals, and in particular, to an earphone-switching method and a mobile terminal.

BACKGROUND

With the maturity of wireless technology, there are more and more scenarios for wireless earphones to connect to mobile terminals such as mobile phones through the wireless technology. People can realize various functions such as listening to music and making phone calls through the wireless earphones. In general, a wireless earphone can be composed of a main earphone and a slave earphone. After the main earphone establishes a data transmission link with the mobile phone, the main earphone synchronizes the received audio data to the slave earphone for playback. In a call scenario, when the main earphone is no longer suitable as a main earphone due to changes in the distance, the main and slave earphones will switch. During the process of the main and slave earphones switching, a short-term call interruption may occur, affecting a call experience of users.

SUMMARY

According to one aspect of the present disclosure, an earphone-switching method in a mobile terminal is provided. The mobile terminal is currently connected with a first earphone. The method includes performing an earphone-switching operation in response to the mobile terminal being in a call state and an earphone-switching condition being met, the earphone-switching operation being configured for switching the first earphone to a second earphone such that the mobile terminal is connected with the second earphone and disconnected with the first earphone; detecting whether at least one of a first voice data and a second voice data is obtained during the earphone-switching operation, the first voice data being sent by the peer terminal during the earphone-switching operation, and the second voice data being collected by the mobile terminal during the earphone-switching operation; and sending the at least one of the first voice data and the second voice data, in response to the at least one of the first voice data and the second voice data being obtained, wherein the first voice data is sent to the second earphone, and the second voice data is sent to the peer terminal.

According to another aspect of the present disclosure, a mobile terminal is provided, which includes a processor and a memory, wherein the memory is configured to store at least one program, when executed by the processor, causing the processor to perform: performing an earphone-switching operation in response to the mobile terminal being in a call state and an earphone-switching condition being met, the earphone-switching operation being configured for switching a first earphone currently connected to the mobile terminal to a second earphone such that the mobile terminal is connected with the second earphone and disconnected with the first earphone; detecting whether at least one of a first voice data and a second voice data is obtained during the earphone-switching operation, the first voice data being sent by the peer terminal during the earphone-switching operation, and the second voice data being collected by the mobile terminal during the earphone-switching operation; and sending the at least one of the first voice data and the second voice data, in response to the at least one of the first voice data and the second voice data being obtained, wherein the first voice data is sent to the second earphone, and the second voice data is sent to the peer terminal.

BRIEF DESCRIPTION OF DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

Figure 1:
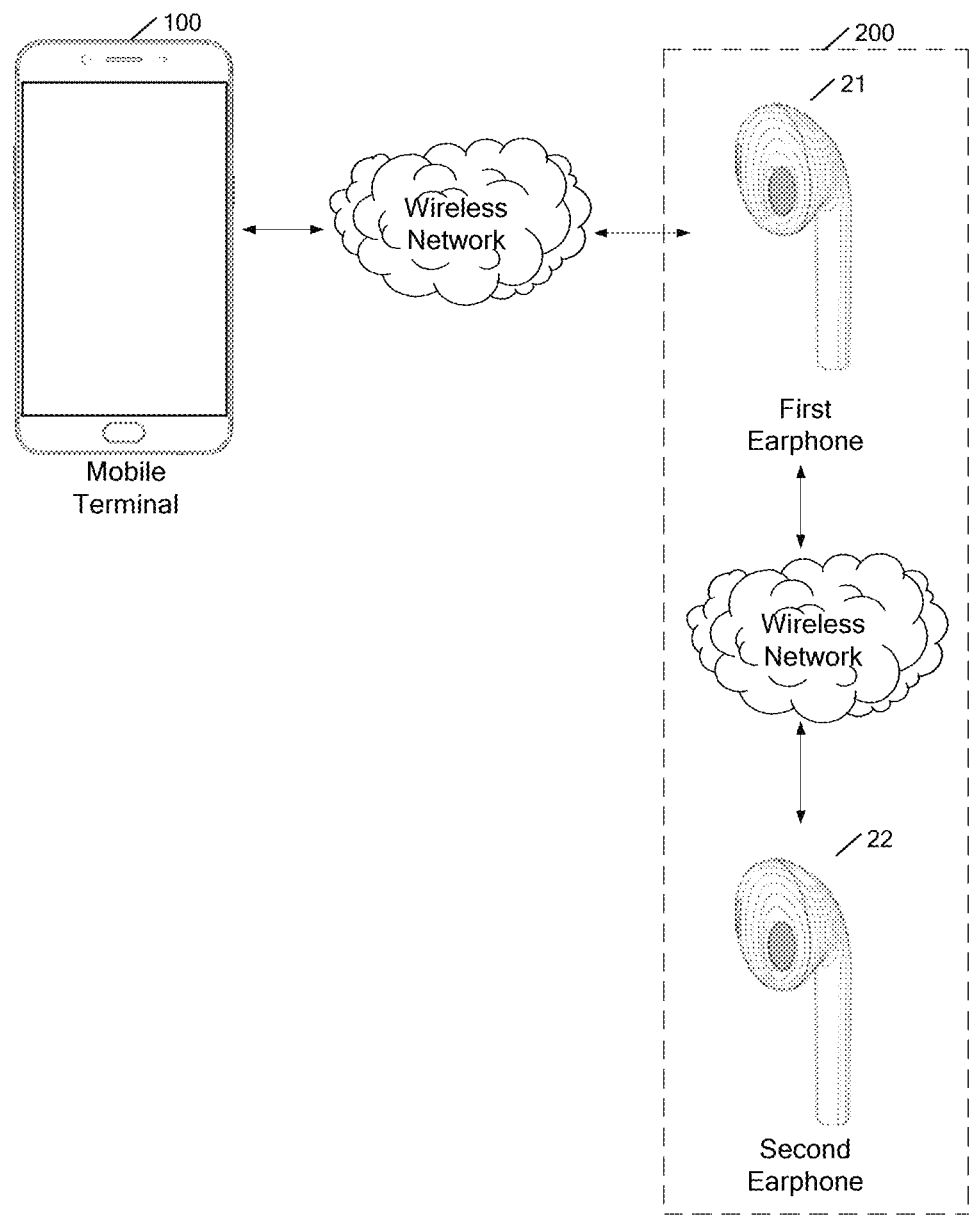
FIG. 1 is a schematic view of a network architecture according to some embodiments of the present disclosure.

To make any one of skill in the art to understand the technical solutions of the present disclosure, the technical solutions provided by the present disclosure will be described in details by referring to the drawings and the embodiments. Obviously, the described embodiments are only a part of the embodiments, but not all the embodiments of the present disclosure. Based on the described embodiments, all other embodiments obtained by one skilled in the art without creative efforts shall fall within the scope of the present disclosure.

Terms of "first", "second", and the like in the description and claims of the present disclosure and the above-mentioned drawings are used to distinguish different objects and not to describe a specific order. Furthermore, the terms of "including", "having" and any variations thereof are intended to cover non-exclusive inclusion. For example, a process, method, system, product, or device containing a series of steps or units is not limited to the listed steps or units, but optionally also includes steps or units that are not listed, or optionally also includes other steps or units inherent to the process, method, product or device.

Reference to "embodiment" herein means that a particular feature, structure, or characteristic described in connection with the embodiment may be included in at least one embodiment of the present disclosure. The appearances of this term in various places in the specification are not necessarily all referring to the same embodiment, nor are they independent or alternative embodiments that are mutually exclusive with other embodiments. It is explicitly and implicitly understood by one skilled in the art that the embodiments described herein may be combined with other embodiments.

The mobile terminals involved in the embodiments of the present disclosure may include various handheld devices, vehicle-mounted devices, wearable devices, computing devices with wireless communication functions, or other processing devices connected to a wireless modem, and various forms of user equipments (UE), mobile stations (MS), terminal devices, and so on. For ease of description, the devices mentioned above are collectively referred to as a mobile terminal.

An earphone-switching method in a mobile terminal is provided. The mobile terminal is currently connected with a first earphone. The method includes performing an earphone-switching operation in response to the mobile terminal being in a call state and an earphone-switching condition being met, the earphone-switching operation being configured for switching the first earphone to a second earphone such that the mobile terminal is connected with the second earphone and disconnected with the first earphone; detecting whether at least one of a first voice data and a second voice data is obtained during the earphone-switching operation, the first voice data being sent by the peer terminal during the earphone-switching operation, and the second voice data being collected by the mobile terminal during the earphone-switching operation; and sending the at least one of the first voice data and the second voice data, in response to the at least one of the first voice data and the second voice data being obtained, wherein the first voice data is sent to the second earphone, and the second voice data is sent to the peer terminal.

In some embodiments, the first voice data is sent to the second earphone in response to the first voice data indicating a complete text, the complete text comprising all of a subject, a predicate, and an object.

In some embodiments, the method further includes sending a first target voice data to the second earphone in response to the first voice data indicating an incomplete text, the incomplete text comprising any one or two of a subject, a predicate, and an object, wherein the first target voice data is obtained by compensating the first voice data via a first preset voice compensation algorithm.

In some embodiments, the second voice data is sent to the peer terminal in response to the second voice data indicating a complete text, the complete text comprising all of a subject, a predicate, and an object.

In some embodiments, the method further includes sending a second target voice data to the second earphone in response to the second voice data indicating an incomplete text, the incomplete text comprising any one or two of a subject, a predicate, and an object, wherein the second target voice data is obtained by compensating the second voice data via a second preset voice compensation algorithm.

In some embodiments, the method further includes buffering the at least one of the first voice data and the second voice data during the earphone-switching operation.

In some embodiments, the method further includes sending a first voice notification to the first earphone before the earphone-switching operation, the first voice notification being configured to notify that the earphone-switching operation is being performed in the mobile terminal; and sending a second voice notification to the second earphone after the earphone-switching operation, the second voice notification being configured to notify that the earphone-switching operation has been performed in the mobile terminal.

In some embodiments, the met earphone-switching condition comprises a first distance between the mobile terminal and the first earphone being greater than a second distance between the mobile terminal and the second earphone, and a third distance between the first earphone and the second earphone being greater than or equal to a first threshold.

In some embodiments, the first distance between the mobile terminal and the first earphone is determined by the mobile terminal from a first received signal strength indicator (RSSI) value between the mobile terminal and the first earphone; the second distance between the mobile terminal and the second earphone is determined by the mobile terminal from a second RSSI value between the mobile terminal and the second earphone, and the second RSSI value is broadcast periodically from the second earphone to the mobile terminal; the third distance between the first earphone and the second earphone is determined by the mobile terminal from a third RSSI value between the first earphone and the second earphone, and the third RSSI value is obtained by the first earphone and sent from the first earphone to the mobile terminal.

In some embodiments, wherein the met earphone-switching condition comprises a first received signal strength indicator (RSSI) value being less than a preset strength-threshold, the first RSSI value indicates a strength of a signal received by the mobile terminal from the first earphone.

In some embodiments, the met earphone-switching condition comprises a remaining power of the first earphone being less than a remaining power of the second earphone, and a difference between the remaining power of the first earphone and the remaining power of the second earphone is greater than a preset power-threshold.

A mobile terminal is provided, which includes a processor and a memory, wherein the memory is configured to store at least one program, when executed by the processor, causing the processor to perform: performing an earphone-switching operation in response to the mobile terminal being in a call state and an earphone-switching condition being met, the earphone-switching operation being configured for switching a first earphone currently connected to the mobile terminal to a second earphone such that the mobile terminal is connected with the second earphone and disconnected with the first earphone; detecting whether at least one of a first voice data and a second voice data is obtained during the earphone-switching operation, the first voice data being sent by the peer terminal during the earphone-switching operation, and the second voice data being collected by the mobile terminal during the earphone-switching operation; and sending the at least one of the first voice data and the second voice data, in response to the at least one of the first voice data and the second voice data being obtained, wherein the first voice data is sent to the second earphone, and the second voice data is sent to the peer terminal.

In some embodiments, the first voice data is sent to the second earphone in response to the first voice data indicating a complete text, the complete text comprising all of a subject, a predicate, and an object.

In some embodiments, a first target voice data is sent to the second earphone in response to the first voice data indicating an incomplete text, the incomplete text comprising any one or two of a subject, a predicate, and an object, wherein the first target voice data is obtained by compensating the first voice data via a first preset voice compensation algorithm.

In some embodiments, the second voice data is sent to the peer terminal in response to the second voice data indicating a complete text, the complete text comprising all of a subject, a predicate, and an object.

In some embodiments, a second target voice data is sent to the second earphone in response to the second voice data indicating an incomplete text, the incomplete text comprising any one or two of a subject, a predicate, and an object, wherein the second target voice data is obtained by compensating the second voice data via a second preset voice compensation algorithm.

In some embodiments, the at least one of the first voice data and the second voice data is buffered during the earphone-switching operation.

In some embodiments, the met earphone-switching condition comprises a first distance between the mobile terminal and the first earphone being greater than a second distance between the mobile terminal and the second earphone, and a third distance between the first earphone and the second earphone being greater than or equal to a first threshold.

In some embodiments, the met earphone-switching condition comprises a first received signal strength indicator (RSSI) value being less than a preset strength-threshold, the first RSSI value indicates a strength of a signal received by the mobile terminal from the first earphone.

In some embodiments, the met earphone-switching condition comprises a remaining power of the first earphone being less than a remaining power of the second earphone, and a difference between the remaining power of the first earphone and the remaining power of the second earphone is greater than a preset power-threshold.

The embodiments of the present disclosure are described in detail below.

As shown in FIG. 1, FIG. 1 is a schematic view of a network architecture according to some embodiments of the present disclosure. The network architecture includes a mobile terminal 100 and a wireless earphone 200. The wireless earphone 200 includes a first earphone 21 and a second earphone 22. The mobile terminal 100 and the first earphone 21 communicate with each other through a wireless network (for example, Wi-Fi, Bluetooth). The first earphone 21 communicates with the second earphone 22 through a wireless network.

The mobile terminal 100 may include various handheld devices, vehicle-mounted devices, wearable devices, computing devices with wireless communication functions, or other processing devices connected to a wireless modem, and various forms of user equipments (UE), mobile stations (MS), terminal devices, and so on.

The first earphone 21 in FIG. 1 establishes a communication connection with the mobile terminal 100. The first earphone 21 is a main earphone, and the second earphone 22 is a slave earphone. The main earphone is an earphone that establishes a communication connection with the mobile terminal 100. When the communication quality between the first earphone 21 and the mobile terminal 100 is poor, the mobile terminal 100 may be disconnected from the first earphone 21 to establish a communication connection with the second earphone 22, thereby configuring the second earphone 22 as the main earphone. In this way, the main earphone is switched.

The wireless earphone may be an ear-hook earphone, an earplug-type earphone, or a headphone, which is not limited in the embodiments of the present disclosure.

The wireless earphone may be stored in an earphone box. The earphone box may include two receiving cavities (a first receiving cavity and a second receiving cavity). The size and shape of the two receiving cavities are designed to receive the first earphone and the second earphone. The earphone box may further include one or more earphone housing magnetic components arranged in the earphone box. The one or more earphone housing magnetic components are configured to magnetically attract the first earphone and the second earphone and magnetically fix the two earphones respectively. The earphone box may further include an earphone cover. The size and shape of the first receiving cavity are designed to receive the first earphone, and the size and shape of the second receiving cavity are designed to receive the second earphone.

The wireless earphone may include an earphone housing, a rechargeable battery (e.g., a lithium battery) disposed within the earphone housing, multiple metal contacts for connecting the battery to a charging device, and a speaker assembly including a driver unit and a directional sound port. The driver unit includes a magnet, a voice coil, and a diaphragm. The driver unit is configured to emit sound from a directional sound port. The multiple metal contacts are disposed on an outer surface of the earphone housing.

In some embodiments, the wireless earphone may further include a touch area. The touch area may be located on an external surface of the earphone housing. In the touch area, at least one touch sensor for detecting a touch operation is arranged. The touch sensor may include a capacitor sensor. When a user touches the touch area, at least one capacitive sensor can detect a change in capacitance to recognize the touch operation.

In some embodiments, the wireless earphone may further include an acceleration sensor and a three-axis gyroscope. The acceleration sensor and the three-axis gyroscope may be disposed in the earphone housing. The acceleration sensor and the three-axis gyroscope are configured to identify a pick-up action and a removal action of the wireless earphone.

In some embodiments, the wireless earphone may further include at least one air pressure sensor. The air pressure sensor may be disposed on a surface of the earphone housing, for detecting the air pressure in ears after the wireless earphone is worn. A tightness of the wireless earphone may be detected by the air pressure sensor. When the wireless earphone is detected to be loosely worn, the wireless earphone may send a prompt message to an electronic device connected to the wireless earphone to remind the user that the wireless earphone is at risk of falling.

Figure 2:
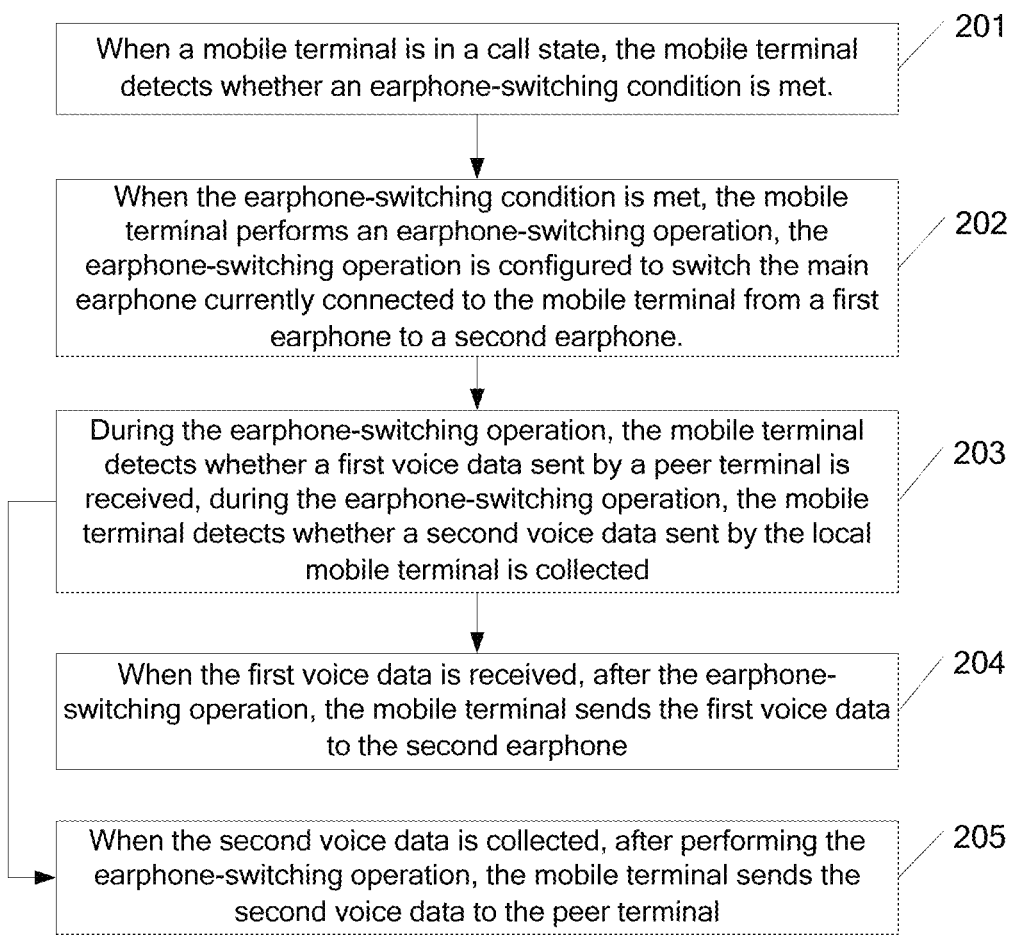
FIG. 2 is a flow chart of an earphone-switching method according to some embodiments of the present disclosure.

As shown in FIG. 2, FIG. 2 is a flow chart of an earphone-switching method according to some embodiments of the present disclosure. The method may include operations at blocks illustrated in FIG. 2.

At block 201: When a mobile terminal is in a call state, the mobile terminal detects whether an earphone-switching condition is met.

In the embodiments of the present disclosure, the call state refers to a state in which the mobile terminal is in a connected call. When the mobile terminal is in the call state, a first user talks to a second user through the mobile terminal. The first user receives a voice call data sent by the second user through the mobile terminal, and sends the voice call data to the second user through the mobile terminal. The voice call data refers to voice data sent during a call between the first user and the second user.

When the mobile terminal communicates with a pair of wireless earphones, the mobile terminal establishes a communication connection with only one of the earphones to save a power consumption of the mobile terminal and reduce a communication complexity of the same. The earphone that establishes the communication connection with the mobile terminal is the main earphone. The main earphone not only establishes the communication connection with the mobile terminal, but also establishes a communication connection with a slave earphone. After receiving an audio data sent by the mobile terminal, the main earphone may synchronize the audio data to the slave earphone for playback.

For example, the wireless earphone includes a first earphone and a second earphone, the mobile terminal establishes a communication connection with the first earphone of the wireless earphone, and the first earphone of the wireless earphone establishes a communication connection with the second earphone of the wireless earphone. The wireless earphone includes a pair of earphones (the first earphone and the second earphone). The first earphone is a main earphone and the second earphone is a slave earphone. The main earphone is an earphone that establishes a communication connection with the mobile terminal. The slave earphone is an earphone that is not directly connected to the mobile terminal. The slave earphone establishes a communication connection with the main earphone. The communication connection may be a Bluetooth connection.

The earphone-switching condition may be determined based on a communication quality between the mobile terminal and the first earphone. When the communication quality between the mobile terminal and the first earphone is poor, the main earphone is switched from the first earphone to the second earphone.

For example, when the mobile terminal is connected to the first earphone, a first received signal strength indicator (RSSI) of the mobile terminal receiving the first earphone may be obtained. The first RSSI is configured to measure the signal strength of the mobile terminal receiving the first earphone. The unit of RSSI may be dBm or asu. dBm represents an absolute value of power, and the signal strength is generally negative. The smaller the absolute value of dBm, the stronger the signal strength. asu is a defined unique signal unit. The greater the value of asu, the stronger the signal strength. When the first RSSI is less than a preset intensity threshold, the earphone-switching condition is considered to be met. That is, the met earphone-switching condition comprises a first received signal strength indicator (RSSI) value being less than a preset strength-threshold, the first RSSI value indicates a strength of a signal received by the mobile terminal from the first earphone.

The preset intensity threshold may be set in advance and stored in a non-volatile memory of the mobile terminal. For example, the preset intensity threshold may be set to −95 dBm.

In some embodiments, the earphone-switching condition may be determined based on the power of the first earphone and that of the second earphone. For example, when the first earphone is the main earphone, the mobile terminal may obtain a remaining power of the first earphone and that of the second earphone. When the remaining power of the first earphone is less than that of the second earphone, and the difference between the remaining power of the first earphone and that of the second earphone is greater than a preset power threshold, the earphone-switching condition is considered to be met. That is, the met earphone-switching condition comprises a remaining power of the first earphone being less than a remaining power of the second earphone, and a difference between the remaining power of the first earphone and the remaining power of the second earphone is greater than a preset power-threshold.

The preset power threshold may be set in advance and stored in the non-volatile memory of the mobile terminal. For example, the preset power threshold may be set to 20% of the battery capacity of the earphone.

In some embodiments, the detecting, by mobile terminal, whether the earphone-switching condition is met in the operation at block 201 includes operations as followed.

The mobile terminal detects a first distance between the mobile terminal and the first earphone, detects a second distance between the mobile terminal and the second earphone, and detects a third distance between the first earphone and the second earphone.

When the first distance is greater than the second distance and the third distance is greater than or equal to a first threshold, the mobile terminal determines that the earphone-switching condition is met. That is, the met earphone-switching condition comprises a first distance between the mobile terminal and the first earphone being greater than a second distance between the mobile terminal and the second earphone, and a third distance between the first earphone and the second earphone being greater than or equal to a first threshold.

In some embodiments, a specific implementation of the detecting, by the mobile terminal, the first distance between the mobile terminal and the first earphone, the second distance between the mobile terminal and the second earphone, and the third distance between the first earphone and the second earphone may include that the mobile terminal obtains a first position of the first earphone, a second position of the second earphone, and a third position of the mobile terminal; the mobile terminal determines the first distance between the mobile terminal and the first earphone based on the first position and the third position; the mobile terminal determines the second distance between the mobile terminal and the second earphone based on the second position and the third position; the mobile terminal determines the third distance between the first earphone and the second earphone based on the first position and the second position.

Specifically, the mobile terminal may determine its own position directly through a Wi-Fi positioning technology, but the positions of the first earphone and the second earphone cannot be obtained by the mobile terminal itself through the Wi-Fi positioning technology.

A specific implementation of the determining, by mobile terminal, the position of the first earphone and the position of the second earphone may include that the second earphone determines the position of the second earphone through the Wi-Fi positioning, and periodically reports the position of the second earphone to the first earphone; after receiving the position of the second earphone reported by the second earphone, the first earphone determines the position of the first earphone through the Wi-Fi positioning, and reports the positions of the first earphone and the second earphone to the mobile terminal; the mobile terminal receives the positions of the first earphone and the second earphone reported by the first earphone.

Further, a specific implementation manner of the determining, by the mobile terminal, the third position of the mobile terminal may include that after receiving the positions of the first earphone and the second earphone reported by the first earphone, the mobile terminal determines the position of the mobile terminal through the Wi-Fi positioning.

It should be noted that, in the present disclosure, the mobile terminal may also determine the third position before determining the first position and the second position, which is not limited herein. The wireless access points applied by the mobile terminal for Wi-Fi positioning, applied by the first earphone for Wi-Fi positioning, and applied by the second earphone for Wi-Fi positioning may be the same. The position of the mobile terminal, the position of the first earphone, and the position of the second earphone may be all represented by position coordinates. When the positions of the two points are known, determining the distance between the two points is prior art, and will not be described herein.

In some embodiments, a specific implementation of the detecting, by the mobile terminal, the first distance between the mobile terminal and the first earphone, the second distance between the mobile terminal and the second earphone, and the third distance between the first earphone and the second earphone may include that the mobile terminal determines a first RSSI value of the first earphone and the mobile terminal, and determines the first distance based on the first RSSI value; the mobile terminal determines a second RSSI value of the second earphone and the mobile terminal, and determines the second distance based on the second RSSI value; the mobile terminal determines a third RSSI value of the first earphone and the second earphone, and determines the third distance based on the third RSSI value.

Specifically, since the mobile terminal is connected to the first earphone, the mobile terminal can directly obtain the first RSSI value of the mobile terminal and the first earphone, but the mobile terminal cannot directly obtain the second RSSI value of the mobile terminal and the second earphone and the third RSSI value of the first earphone and the second earphone.

A specific implementation of the determining, by mobile terminal, the third RSSI value of the first earphone and the second earphone may include that the first earphone determines the third RSSI value of the first earphone and the second earphone, and the first earphone sends the third RSSI value to the mobile terminal, and the mobile terminal receives the third RSSI value sent by the first earphone; or, the mobile terminal sends an RSSI value acquisition request to the first earphone, and after receiving the RSSI value acquisition request, the first earphone determines the third RSSI value of the first earphone and the second earphone, then the first earphone sends the third RSSI value to the mobile terminal, and the mobile terminal receives the third RSSI value sent by the first earphone.

A specific implementation of the determining, by mobile terminal, the second RSSI value of the mobile terminal and the second earphone may include that the second earphone periodically sends a Bluetooth Low Energy (BLE) broadcast to the mobile terminal through a BLE broadcast method; after receiving the BLE broadcast sent by the second earphone, the mobile terminal obtains the second RSSI value of the second earphone and the mobile terminal.

A specific implementation for the mobile terminal to determine the distance according to the RSSI value may include that the mobile terminal determines the distance corresponding to the RSSI value based on a mapping relationship between the RSSI value and the distance. In the mapping relationship between the RSSI value and the distance, the RSSI value is inversely proportional to the distance. The greater the RSSI value, the smaller the distance. The smaller the RSSI value, the greater the distance.

Further, an order in which the mobile terminal detects the first distance, the second distance, and the third distance may specifically include that after receiving the BLE broadcast sent by the second earphone, the mobile terminal obtains the second RSSI value, and the mobile terminal firstly determines the second distance based on the second RSSI value; then the mobile terminal sends the RSSI value acquisition request to the first earphone, after receiving the RSSI acquisition request, the first earphone determines the third RSSI value and sends the third RSSI value to the mobile terminal; the mobile terminal receives the third RSSI value sent by the first earphone, and firstly determines the third distance based on the third RSSI value; finally, the mobile terminal determines the first RSSI value, and then determines the first distance based on the first RSSI value.

Of course, in the present disclosure, the mobile terminal may also detect the first distance, then the second distance, and finally the third distance, or may detect the third distance, then determine the first distance, and finally determine the second distance, which is not limited herein.

In the embodiments of the present disclosure, the mobile terminal is required to detect not only the first distance and the second distance, but also the third distance, such that the mobile terminal may not repeatedly switch the main earphone. When the third distance is less than the first threshold, it is indicated that the first earphone and the second earphone are close. In this case, even if the main earphone is switched, the communication quality of the main earphone will not be significantly improved. Therefore, in the present disclosure, the earphone-switching condition is required to be determined to be met, when the first distance is greater than the second distance and the third distance is greater than or equal to the first threshold. The first threshold may be set in advance and stored in a memory of the mobile terminal. For example, the first threshold may be set to 50 cm.

At block 202: When the earphone-switching condition is met, the mobile terminal performs an earphone-switching operation. The earphone-switching operation is configured to switch the main earphone currently connected to the mobile terminal from a first earphone to a second earphone.

In the embodiments of the present disclosure, the performing, by mobile terminal, the earphone-switching operation may specifically include that the mobile terminal disconnects the communication connection between the mobile terminal and the first earphone, establishes a communication connection between the mobile terminal and the second earphone, and switches the main earphone of the mobile terminal from the first earphone to the second earphone. That is, the earphone-switching operation is configured for switching the first earphone to a second earphone such that the mobile terminal is connected with the second earphone and disconnected with the first earphone.

At block 203: During the earphone-switching operation, the mobile terminal detects whether a first voice data sent by a peer terminal is received. During the earphone-switching operation, the mobile terminal detects whether a second voice data sent by the local mobile terminal is collected.

That is, the mobile terminal detects whether at least one of a first voice data and a second voice data is obtained during the earphone-switching operation.

At block 204: When the first voice data is received, after the earphone-switching operation, the mobile terminal sends the first voice data to the second earphone.

At block 205: When the second voice data is collected, after the earphone-switching operation, the mobile terminal sends the second voice data to the peer terminal.

That is, the at least one of the first voice data and the second voice data is sent in response to the at least one of the first voice data and the second voice data being obtained, wherein the first voice data is sent to the second earphone, and the second voice data is sent to the peer terminal.

In the embodiments of the present disclosure, the local mobile terminal is the mobile terminal, the user at the local mobile terminal refers to the user of the mobile terminal, and the peer terminal refers to a communication device (such as a mobile phone) that makes the voice call with the mobile terminal. For example, the mobile terminal is a first mobile phone, and the communication device for making the voice call with the mobile terminal is a second mobile phone. The user of the first mobile phone is a first user, and the user of the second mobile phone is a second user. When the first mobile phone and the second mobile phone are in the voice call, the first mobile phone can collect the voice data sent by the first user and send the voice data to the second mobile phone. The second mobile phone can receive the voice data sent by the first user, and can also collect the voice data sent by the second user and send the voice data to the first mobile phone. The first mobile phone can receive the voice data sent by the second user. The first mobile phone and the second mobile phone may establish a communication link through a mobile communication network (for example, a 2G network, a 3G network, a 4G network, or a 5G network). The first mobile phone and the second mobile phone may send voice data to each other through the communication link.

During the mobile terminal performs the earphone-switching operation, since it takes a certain time (for example, 500 ms) to perform the earphone-switching operation, when the mobile terminal receives the first voice data sent by the peer terminal, the mobile terminal may buffer the first voice data, and wait until the earphone-switching operation is completed before sending the buffered first voice data to the second earphone. Then the second earphone plays the first voice data. During the mobile terminal performs the earphone-switching operation, when the first earphone or the second earphone collects the second voice data sent by the user at the local end, the first earphone or the second earphone buffers the second voice data and waits until the earphone-switching operation is completed before sending the buffered second voice data to the mobile terminal. Then the mobile terminal sends the second voice data to the peer terminal. In the embodiments of the present disclosure, the voice data sent by the peer terminal and the voice data generated by the user at the local mobile terminal during the process of the earphone-switching may be restored and transmitted. In this way, a voice loss during the process of the earphone-switching may be reduced, and an impact of the earphone-switching on calls may be mitigated.

Each of the first earphone and the second earphone may include a communication module, a microphone, and a speaker. The communication module of the first earphone is configured to establish a communication connection with the mobile terminal and with the second earphone. The communication module of the second earphone is configured to establish a communication connection with the mobile terminal and with the first earphone. The microphone of the first earphone and that of the second earphone are configured to collect voice data sent by the user. The speaker of the first earphone is configured to play voice data sent by the mobile terminal or the second earphone. The speaker of the second earphone is configured to play voice data sent by the mobile terminal or the first earphone.

It should be noted that during the transmission of voice data, operations such as encoding, modulation, demodulation, and decoding are performed.

In some embodiments, before the earphone-switching operation, the following operations may be performed.

The mobile terminal sends a first voice notification to the first earphone. The first voice notification is configured to notify that the mobile terminal is the earphone-switching operation is being performed in the mobile terminal.

After the earphone-switching operation, the following operations may be performed.

The mobile terminal sends a second voice notification to the second earphone. The second voice notification is configured to notify that the earphone-switching operation has been performed in the mobile terminal.

In the embodiments of the present disclosure, the first voice notification may notify the user that the mobile terminal is performing the earphone-switching, and the user may not issue a voice after hearing the first voice notification. The second voice notification may notify the user that the mobile terminal has completed the earphone-switching. After the user hears the second voice notification, the user may continue to make a voice and continue the voice call.

In the embodiments of the present disclosure, when the mobile terminal is in a call state, after the earphone-switching operation is performed, the voice data sent by the peer terminal and the voice data generated by the user at the mobile terminal during the process of the earphone-switching may be restored and transmitted. In this way, a voice loss during the process of the earphone-switching may be reduced, and an impact of the earphone-switching on calls may be mitigated.

Figure 3:
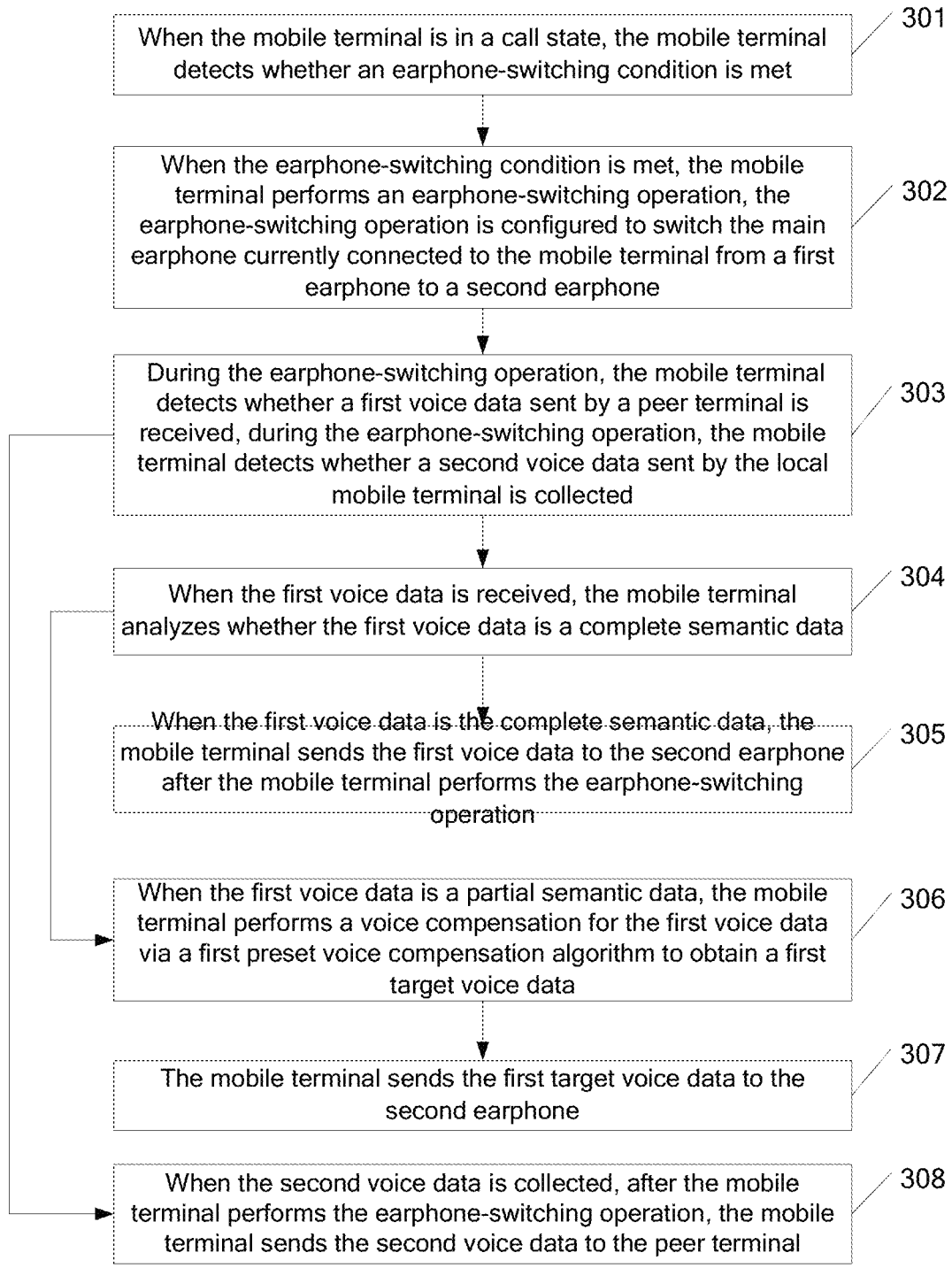
FIG. 3 is a flow chart of an earphone-switching method according to another some embodiments of the present disclosure.

As shown in FIG. 3, FIG. 3 is a flow chart of an earphone-switching method according to another some embodiments of the present disclosure. The method may include operations at blocks illustrated in FIG. 3.

At block 301: When the mobile terminal is in a call state, the mobile terminal detects whether an earphone-switching condition is met.

At block 302: When the earphone-switching condition is met, the mobile terminal performs an earphone-switching operation. The earphone-switching operation is configured to switch the main earphone currently connected to the mobile terminal from a first earphone to a second earphone.

At block 303: During the earphone-switching operation, the mobile terminal detects whether a first voice data sent by a peer terminal is received. During the earphone-switching operation, the mobile terminal detects whether a second voice data sent by the local mobile terminal is collected.

Operations at blocks 301 to 303 in the embodiments of the present disclosure may be referred to operations at blocks 201 to 203 shown in FIG. 2, and details are not described herein again.

At block 304: When the first voice data is received, the mobile terminal analyzes whether the first voice data is a complete semantic data.

In the embodiments of the present disclosure, the analyzing, by mobile terminal, whether the first voice data is a complete semantic data specifically includes that the mobile terminal analyzes whether the semantics of a text corresponding to the first voice data are complete. When the semantics are complete, the first voice data is considered to be the complete semantic data. Whether the semantics are complete may be determined by analyzing whether the text corresponding to the first voice data includes a subject, a predicate, and an object. When all the three (a subject, a predicate, and an object) are included, the semantics are considered complete. When the three are not all included (for example, only the subject, or only the predicate, or only the object, or only the attributive, or only the adverbial is included), the semantics are considered incomplete. For example, if the text corresponding to the first voice data is "I miss you", the first voice data is considered to be the complete semantic data. If the text corresponding to the first voice data is "I", "I miss", "miss", "miss you" or "you", the first voice data is considered not to be the complete semantic data but a partial semantic data. That is, the complete semantic data means a complete text, and the complete text includes all of a subject, a predicate, and an object. The partial semantic data means incomplete text, the incomplete text includes any one or two of a subject, a predicate, and an object.

At block 305: When the first voice data is the complete semantic data, the mobile terminal sends the first voice data to the second earphone after the mobile terminal performs the earphone-switching operation.

At block 306: When the first voice data is a partial semantic data, the mobile terminal performs a voice compensation for the first voice data via a first preset voice compensation algorithm to obtain a first target voice data.

In the embodiments of the present disclosure, when the first voice data is the complete semantic data, it is indicated that the user at the local end of the mobile terminal may quickly understand the first voice data sent by the peer terminal, and then the first voice data may be directly sent to the second earphone. When the first voice data is the partial semantic data, it is indicated that the user of the mobile terminal has difficulty understanding the first voice data sent by the peer terminal, and then the mobile terminal performs the voice compensation for the first voice data via the first preset voice compensation algorithm to obtain the first target voice data.

The first preset voice compensation algorithm is configured to compensate the first voice data to the complete semantic data. Specifically, the mobile terminal may combine the first voice data and the compensated first voice data into the complete semantic data.

At block 307: The mobile terminal sends the first target voice data to the second earphone.

At block 308: When the second voice data is collected, after the mobile terminal performs the earphone-switching operation, the mobile terminal sends the second voice data to the peer terminal.

In the embodiments of the present disclosure, when the mobile terminal is in the call state, after the earphone-switching operation is performed, the voice data sent by the peer terminal and the voice data generated by the user at the local mobile terminal during the earphone-switching may be restored and transmitted. In this way, a voice loss during the earphone-switching may be reduced, and an impact of the earphone-switching on calls may be mitigated.

Figure 4:
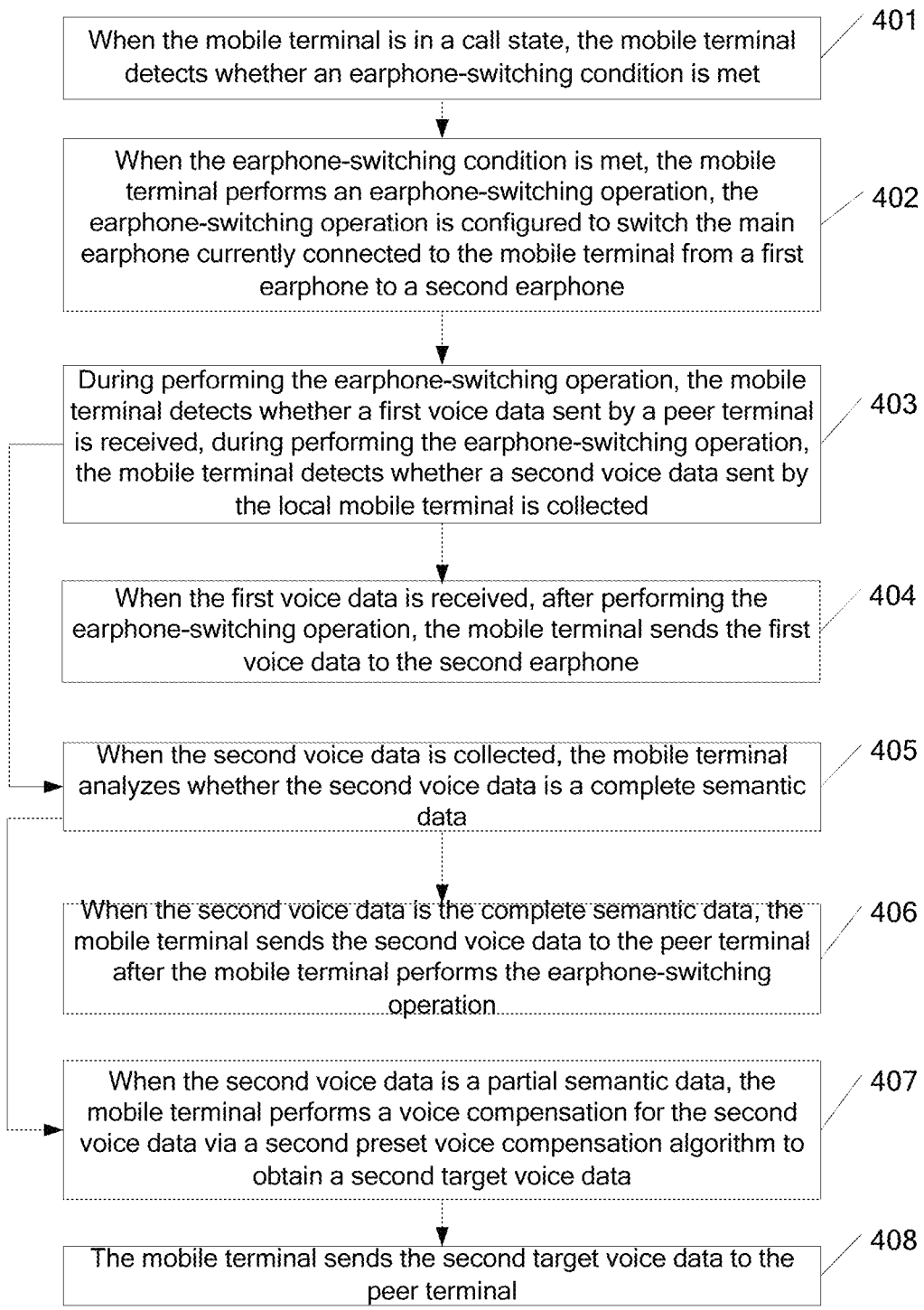
FIG. 4 is a flow chart of an earphone-switching method according to further another embodiment of the present disclosure.

As shown in FIG. 4, FIG. 4 is a flow chart of an earphone-switching method according to further another embodiment of the present disclosure. The method may include operations at block illustrated in FIG. 4.

At block 401: When the mobile terminal is in a call state, the mobile terminal detects whether an earphone-switching condition is met.

At block 402: When the earphone-switching condition is met, the mobile terminal performs an earphone-switching operation. The earphone-switching operation is configured to switch the main earphone currently connected to the mobile terminal from a first earphone to a second earphone.

At block 403: During the earphone-switching operation, the mobile terminal detects whether a first voice data sent by a peer terminal is received. During the earphone-switching operation, the mobile terminal detects whether a second voice data sent by the local mobile terminal is collected.

At block 404: When the first voice data is received, after the earphone-switching operation, the mobile terminal sends the first voice data to the second earphone.

Operations at blocks 401 to 404 in the embodiments of the present disclosure may be referred to operations at blocks 201 to 204 shown in FIG. 2, and details are not described herein again.

At block 405: When the second voice data is collected, the mobile terminal analyzes whether the second voice data is a complete semantic data.

In the embodiments of the present disclosure, the analyzing, by mobile terminal, whether the second voice data is a complete semantic data specifically includes that the mobile terminal analyzes whether the semantics of a text corresponding to the second voice data are complete. When the semantics are complete, the second voice data is considered to be the complete semantic data. Whether the semantics are complete may be determined by analyzing whether the text corresponding to the second voice data includes a subject, a predicate, and an object. When all the three (a subject, a predicate, and an object) are included, the semantics are considered complete. When the three are not all included (for example, only the subject, or only the predicate, or only the object, or only the attributive, or only the adverbial is included), the semantics are considered incomplete. For example, if the text corresponding to the second voice data is "I miss you", the second voice data is considered to be the complete semantic data. If the text corresponding to the second voice data is "I", "I miss", "miss", "miss you" or "you", the second voice data is considered not to be the complete semantic data but a partial semantic data. That is, the complete semantic data means a complete text, and the complete text includes all of a subject, a predicate, and an object. The partial semantic data means incomplete text, the incomplete text includes any one or two of a subject, a predicate, and an object.

At block 406: When the second voice data is the complete semantic data, the mobile terminal sends the second voice data to the peer terminal after the mobile terminal performs the earphone-switching operation.

At block 407: When the second voice data is a partial semantic data, the mobile terminal performs a voice compensation for the second voice data via a second preset voice compensation algorithm to obtain a second target voice data.

In the embodiments of the present disclosure, when the second voice data is the complete semantic data, it is indicated that the user at the local mobile terminal may quickly understand the second voice data sent by the peer terminal, and then the second voice data may be directly sent to the second earphone. When the second voice data is the partial semantic data, it is indicated that the user at the mobile terminal has difficulty understanding the second voice data sent by the peer terminal, and then the mobile terminal performs the voice compensation for the second voice data via the second preset voice compensation algorithm to obtain the second target voice data.

The second preset voice compensation algorithm is configured to compensate the second voice data to the complete semantic data. Specifically, the mobile terminal may combine the second voice data and the compensated second voice data into the complete semantic data.

At block 408: The mobile terminal sends the second target voice data to the peer terminal.

In the embodiments of the present disclosure, when the mobile terminal is in the call state, after the earphone-switching operation is performed, the voice data sent by the peer terminal and the voice data generated by the user at the local mobile terminal during the process of the earphone-switching may be restored and transmitted. In this way, a voice loss during the process of the earphone-switching may be reduced, and an impact of the earphone-switching on calls may be mitigated.

The above mainly introduces the solution of the embodiments of the present disclosure from the perspective of the method-side execution process. It can be understood that, in order to realize the above functions, the mobile terminal includes a hardware structure and/or a software module corresponding to each function. Those skilled in the art should easily realize that the present disclosure may be implemented in the form of hardware or a combination of hardware and computer software by combining the units and algorithm operations of each example described in the embodiments disclosed herein. Whether a certain function is performed by hardware or computer software-driven hardware depends on the specific application of the technical solution and design constraints. Those skilled in the art may implement the described functions in varying ways for each particular application, but such implementation should not be considered outside the scope of the present disclosure.

In the embodiments of the present disclosure, the functional units of the mobile terminal may be divided according to the foregoing method examples. For example, each functional unit may be divided corresponding to each function, or two or more functions may be integrated into one processing unit. The above integrated unit may be implemented in the form of hardware or in the form of software functional unit. It should be noted that the division of the units in the embodiments of the present disclosure is schematic, and is only a logical function division. There may be another division manner in actual implementation.

Figure 5:
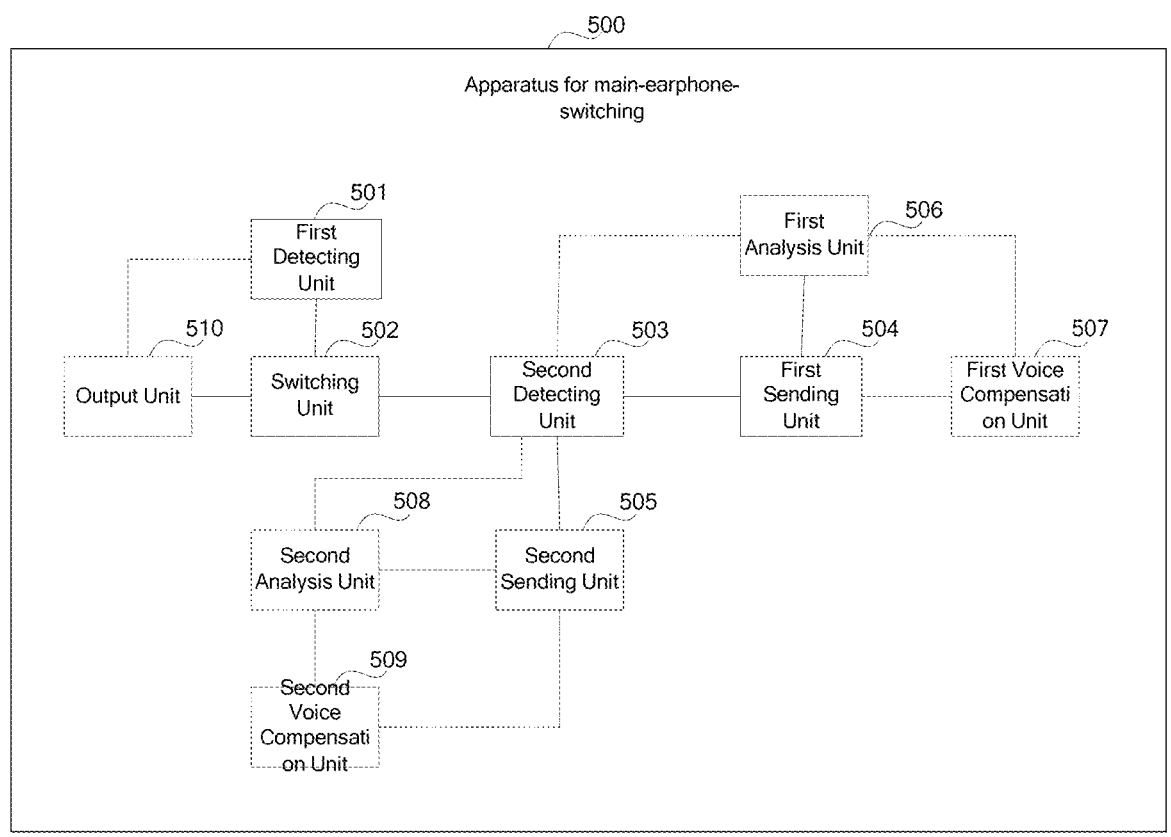
FIG. 5 is a structural schematic view of an apparatus for main-earphone-switching according to some embodiments of the present disclosure.

As shown in FIG. 5, FIG. 5 is a structural schematic view of an apparatus for main-earphone-switching according to some embodiments of the present disclosure. An apparatus 500 is applied to a mobile terminal. An earphone currently connected to the mobile terminal is a first earphone. The earphone-switching device 500 includes a first detecting unit 501, a switching unit 502, a second detecting unit 503, a first sending unit 504, and a second sending unit 505.

The first detecting unit 501 is configured to detect whether an earphone-switching condition is met when the mobile terminal is in a call state.

The switching unit 502 is configured to perform an earphone-switching operation when the first detection unit 501 detects that the earphone-switching condition is met. The earphone-switching operation is configured for switching the main earphone currently connected to the mobile terminal from a first earphone to a second earphone. That is, the earphone-switching operation is configured for switching the first earphone to a second earphone such that the mobile terminal is connected with the second earphone and disconnected with the first earphone.

The second detecting unit 503 is configured to detect whether a first voice data sent by a peer terminal is received, and whether a second voice data sent by the mobile terminal is collected during the earphone-switching operation of the switching unit 502.

When the second detecting unit 503 detects the first voice data sent by the peer terminal, the first sending unit 504 is configured to send the first voice data to the second earphone after the switching unit 502 performs the earphone-switching operation.

When the second detecting unit 503 detects the second voice data sent by the mobile terminal, the second sending unit 505 is configured to send the second voice data to the peer terminal after the switching unit 502 performs the earphone-switching operation.

In some embodiments, as shown in FIG. 5, the earphone-switching device 500 further includes a first analysis unit 506.

The first analysis unit 506 is configured to analyze whether the first voice data is a complete semantic data.

When the first analysis unit 506 analyzes that the first voice data is complete semantic data, the first sending unit 504 is further configured to send the first voice data to the second earphone after the switching unit 502 performs the earphone-switching operation.

In some embodiments, as shown in FIG. 5, the earphone-switching device 500 further includes a first voice compensation unit 507.

When the first analysis unit 506 analyzes that the first voice data is a partial semantic data, the first voice compensation unit 507 is configured to perform a voice compensation for the first voice data via a first preset voice compensation algorithm to obtain a first target voice data.

The first sending unit 504 is further configured to send the first target voice data to the second earphone.

In some embodiments, as shown in FIG. 5, the earphone-switching device 500 further includes a second analysis unit 508.

The second analysis unit 508 is configured to analyze whether the second voice data is the complete semantic data before the second sending unit 505 sends the second voice data to the peer terminal.

When the second analysis unit 508 analyzes that the second voice data is the complete semantic data, the second sending unit 505 is further configured to send the second voice data to the peer terminal after the switching unit 502 performs the earphone-switching operation.

In some embodiments, as shown in FIG. 5, the earphone-switching device 500 further includes a second voice compensation unit 509.

When the second analysis unit 508 analyzes that the second voice data is the partial semantic data, the second voice compensation unit 509 is configured to perform a voice compensation for the second voice data via a second preset voice compensation algorithm to obtain a second target voice data.

The second sending unit 505 is further configured to send the second target voice data to the peer terminal.

In some embodiments, as shown in FIG. 5, the earphone-switching device 500 further includes an output unit 510.

The output unit 510 is configured to send a first voice notification to the first earphone before the switching unit 502 performs the earphone-switching operation. The first voice notification is configured to notify that the earphone-switching operation is being performed in the mobile terminal.

The output unit 510 is further configured to send a second voice notification to the second earphone after the switching unit 502 performs the earphone-switching operation. The second voice notification is configured to notify that the earphone-switching operation has been performed in the mobile terminal.

In some embodiments, the detecting, by first detecting unit 501, whether the earphone-switching condition is met specifically includes that the first detection unit 501 detects a first distance between the mobile terminal and the first earphone, detects a second distance between the mobile terminal and the second earphone, and detects a third distance between the first earphone and the second earphone. When the first distance is greater than the second distance, and the third distance is greater than or equal to a first threshold, it is determined that the earphone-switching condition is met.

In some embodiments, the detecting, by first detecting unit 501, whether the earphone-switching condition is met specifically includes that the first detection unit 501 acquires a first received signal strength indication (RSSI) between the mobile terminal and the first earphone. When the first RSSI is less than a preset strength threshold, it is determined that the earphone-switching condition is met.

In some embodiments, the detecting, by first detecting unit 501, whether the earphone-switching condition is met specifically includes that the first detection unit 501 acquires a remaining power of the first earphone and the remaining power of the second earphone. When the remaining power of the first earphone is less than the remaining power of the second earphone, and the difference between the remaining power of the first earphone and the remaining power of the second earphone is greater than a preset power threshold, it is determined that the earphone-switching condition is met.

The first sending unit 504 and the second sending unit 505 may be a same hardware module. The first analysis unit 506 and the second analysis unit 508 may be a same hardware module. The first voice compensation unit 507 and the second voice compensation unit 509 may be a same hardware module.

For the implementation of the wireless earphone-switching device, reference may be made to the method embodiments shown in FIGS. 1-4, and duplicated details are not described again.

In the embodiments of the earphone-switching device as shown in FIG. 5, when the mobile terminal is in the call state, after the earphone-switching operation is performed, the voice data sent by the peer terminal and the voice data generated by the user at the local mobile terminal during the process of the earphone-switching may be restored and transmitted. In this way, a voice loss during the process of the earphone-switching may be reduced, and an impact of the earphone-switching on calls may be mitigated.

Figure 6:
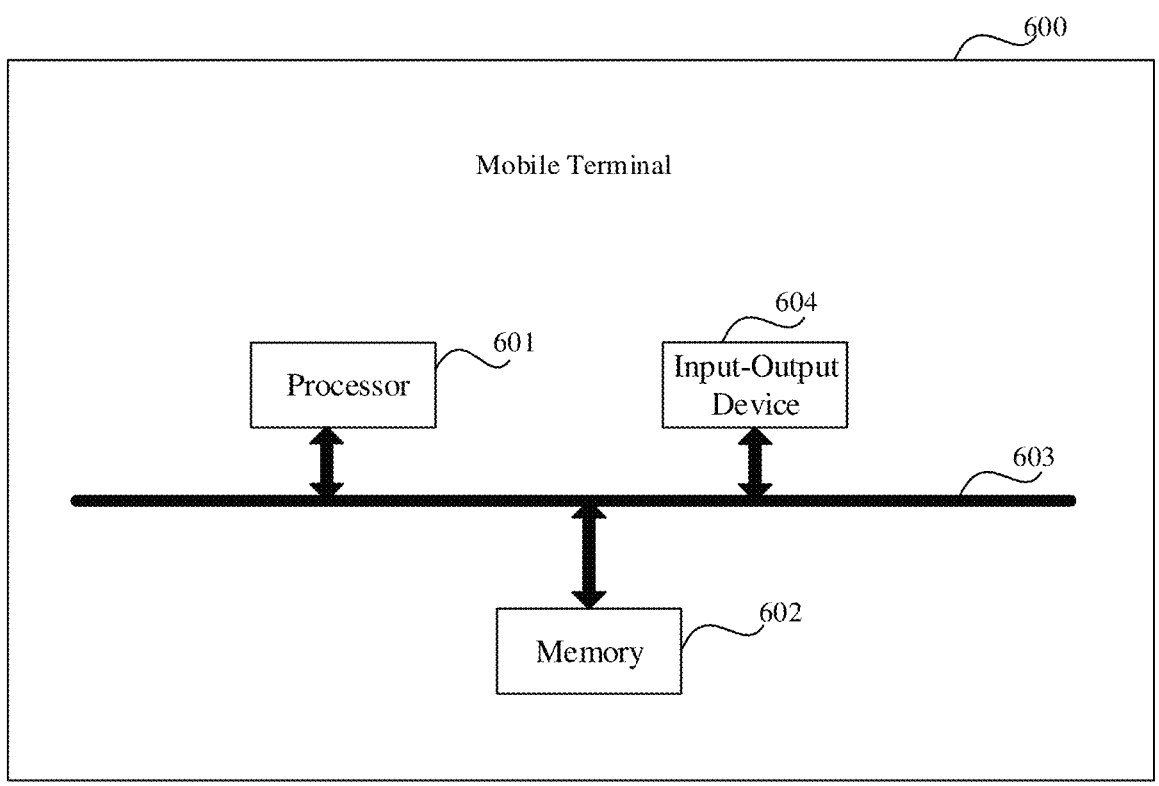
FIG. 6 is a structural schematic view of a mobile terminal according to some embodiments of the present disclosure.

As shown in FIG. 6, FIG. 6 is a structural schematic view of a mobile terminal according to some embodiments of the present disclosure. A mobile terminal 600 includes a processor 601 and a memory 602. The mobile terminal 600 may further include a bus 603. The processor 601 and the memory 602 may be connected to each other through the bus 603. The processor 601 and the memory 602 may be connected to each other through the bus 603. The bus 603 may be a peripheral component interconnect (PCI) bus or an extended industry standard architecture (EISA) bus, etc. The bus 603 may be divided into an address bus, a data bus, a control bus, and the like. For ease of representation, only a thick line is illustrated in FIG. 6, but it does not mean that there is only one bus or one type of bus. The mobile terminal 600 may further include an input-output device 604. The input-output device 604 may include a display screen, such as a liquid crystal display screen. The memory 602 is configured to store one or more programs containing instructions. The processor 601 is configured to call the instructions stored in the memory 602 to execute some or all of the method operations described in the embodiments of FIG. 1 to FIG. 4.

In the embodiments of the mobile terminal as shown in FIG. 6, when the mobile terminal is in the call state, after the earphone-switching operation is performed, the voice data sent by the peer terminal and the voice data generated by the mobile terminal during the process of the earphone-switching may be restored and transmitted. In this way, a voice loss during the process of the earphone-switching may be reduced, and an impact of the earphone-switching on calls may be mitigated.

Figure 7:
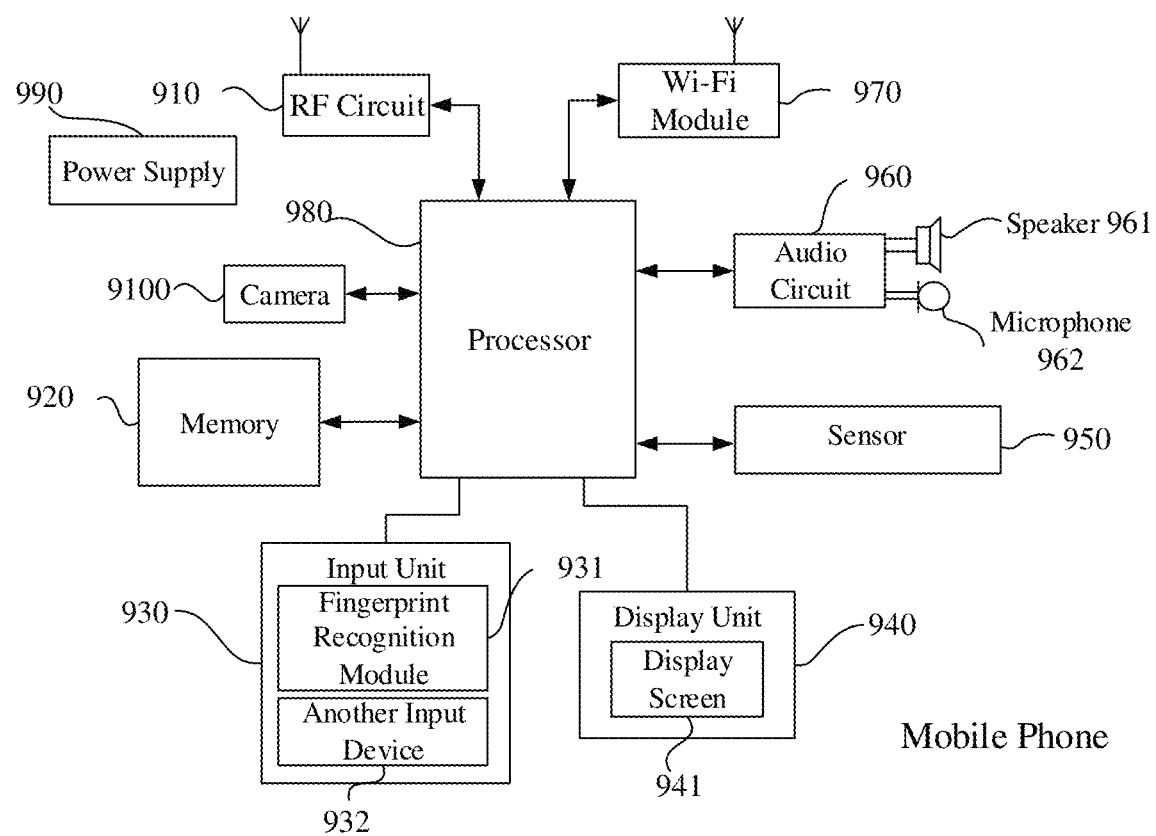
FIG. 7 is a structural schematic view of a mobile terminal according to another some embodiments of the present disclosure.

The present disclosure also provides another mobile terminal. As shown in FIG. 7, for convenience of explanation, only parts related to the embodiment of the present disclosure are shown. For specific technical details not disclosed, reference may be made to the method embodiments of the present disclosure. The mobile terminal may be any terminal device including a mobile phone, a tablet computer, a personal digital assistant (PDA), a point of sales (POS), and a vehicle-mounted computer.

Taking the mobile terminal as a mobile phone as an example, FIG. 7 is a block diagram showing a partial structure of a mobile phone related to a mobile terminal according to some embodiments of the present disclosure. As shown in FIG. 7, the mobile phone includes a radio frequency (RF) circuit 910, a memory 920, an input unit 930, a display unit 940, a sensor 950, an audio circuit 960, a wireless fidelity (Wi-Fi) module 970, a processor 980, and a power supply 990, etc. Those skilled in the art can understand that the structure of the mobile phone shown in FIG. 7 does not constitute a limitation on the mobile phone, and may include more or fewer parts than those shown in the figure, or include a combination of certain parts, or include different arrangements of parts.

The following describes the various components of the mobile phone in detail with reference to FIG. 7.

The RF circuit 910 may be configured to receive and transmit information. Generally, the RF circuit 910 includes, but is not limited to, an antenna, at least one amplifier, a transceiver, a coupler, a low noise amplifier (LNA), a duplexer, and the like. In addition, the RF circuit 910 may also communicate with a network and other devices through a wireless communication. The wireless communication may be applied with any communication standard or protocol, including but not limited to Global System of Mobile (GSM), General Packet Radio Service (GPRS), Code Division Multiple Access (CDMA), Wideband Code Division Multiple Access (WCDMA), Long Term Evolution (LTE), E-mail, Short Messaging Service (SMS), etc.

The memory 920 may be configured to store software programs and modules. The processor 980 executes various functional applications and data processing of the mobile phone by running the software programs and modules stored in the memory 920. The memory 920 may mainly include a storage program area and a storage data area. The storage program area may store an operating system, an application program required for at least one function, and the like. The storage data area may store data created according to the use of the mobile phone, and the like. In addition, the memory 920 may include a high-speed random access memory, and may further include a non-volatile memory, such as at least one magnetic disk storage device, a flash memory device, or other volatile solid-state storage device.

The input unit 930 may be configured to receive inputted numeric or character information, and generate key signal inputs related to user settings and function control of the mobile phone. Specifically, the input unit 930 may include a fingerprint recognition module 931 and another input device 932. The fingerprint recognition module 931 is configured to collect fingerprint data of the user. In addition to the fingerprint recognition module 931, the input unit 930 may also include another input device 932. Specifically, the another input device 932 may include, but is not limited to, one or more of a touch screen, a physical keyboard, function keys (such as volume control keys, switch keys, etc.), a trackball, a mouse, a joystick, and the like.

The display unit 940 may be configured to display information input by the user or information provided to the user and various menus of the mobile phone. The display unit 940 may include a display screen 941. In some embodiments, the display screen 941 may be configured with a liquid crystal display (LCD), an organic (OLED) or inorganic light-emitting diode, and the like.

The mobile phone may further include at least one sensor 950, such as a light sensor, a motion sensor, a pressure sensor, a temperature sensor, and other sensors. Specifically, the light sensor may include an ambient light sensor (also referred to as a light sensor) and a proximity sensor. The ambient light sensor may adjust the brightness of the backlight of the mobile phone according to the brightness of the ambient light, and then adjust the brightness of the display screen 941. The proximity sensor may turn off the display screen 941 and/or backlight, when the mobile phone is moved to ears. As a kind of motion sensor, an accelerometer sensor can detect the magnitude of acceleration in various directions (usually three axes), and detect the magnitude and direction of gravity when it is stationary. The accelerometer sensor may be configured to applications identifying the attitude of mobile phones (such as horizontal and vertical screen switching, magnetometer attitude calibration), vibration recognition related functions (such as pedometer, tap), etc. The mobile phone may also be equipped with a gyroscope, a barometer, a hygrometer, a thermometer, an infrared sensor and other sensors, which will not be repeated herein.

The audio circuit 960, the speaker 961, and the microphone 962 can provide an audio interface between the user and the mobile phone. The audio circuit 960 may convert the received electrical data into an electrical signal and transmit the electrical signal to the speaker 961. The speaker 961 converts the electrical signal into a sound signal for playback. On the other hand, the microphone 962 converts the collected sound signal into an electrical signal. After receiving the electrical signal, the audio circuit 960 converts the electrical signal into an audio data. The audio data is processed by the processor 980 (such as an audio data playback processor), and then sent to, for example, another mobile phone via the RF circuit 910. Or, the audio data is stored in the memory 920 for further processing.

Wi-Fi is a short-range wireless transmission technology. The mobile phone may help users send and receive emails, browse web pages, and access streaming media through the Wi-Fi module 970, providing the users with a wireless broadband Internet access.

Although FIG. 7 shows the Wi-Fi module 970, it can be understood that the Wi-Fi module 970 does not belong to a necessary configuration of the mobile phone, and can be omitted as needed without changing the essence of the present disclosure.

The processor 980 is a control center of the mobile phone. The processor 980 uses various interfaces and lines to connect various parts of the entire mobile phone. The processor 980 runs or executes software programs and/or modules stored in the memory 920 and calls data stored in the memory 920 to execute various functions and processing data of the mobile phone, so as to monitor the mobile phone as a whole. In some embodiments, the processor 980 may include one or more processing units. The processor 980 may integrate an application processor and a modem processor. The application processor mainly processes an operating system, a user interface, and an application program, etc. The modem processor mainly handles wireless communication. It can be understood that the modem processor may not be integrated into the processor 980.

The mobile phone may also include a power supply 990 (such as a battery) for supplying power to various components. In some embodiments, the power supply may be logically connected to the processor 980 through a power management system, so as to implement functions such as managing charging, discharging, and power consumption management through the power management system.

The mobile phone may further include a camera 9100 configured to capture images and videos, and transmit the captured images and videos to the processor 980 for processing.

The mobile phone may also include a Bluetooth module, etc., which is not repeated here.

In the embodiments shown in FIG. 1 to FIG. 4, each operation can be implemented based on the structure of the mobile phone.

The present disclosure further provides a computer storage medium. The computer storage medium stores a computer program for electronic data exchange. The computer program causes a computer to execute all or part of operations in any one of the earphone-switching methods described in the foregoing embodiments.

The present disclosure further provides a computer program product. The computer program product includes a non-transitory computer-readable storage medium storing a computer program. The computer program causes a computer to execute all or part of operations in any one of the earphone-switching methods described in the foregoing embodiments.

It should be noted that, for simplicity of description, the foregoing method embodiments are all described as a series of action combinations, but those skilled in the art should know that the present disclosure is not limited by the described action order. According to the present disclosure, certain operations may be performed in another order or simultaneously. Moreover, those skilled in the art should also know that the embodiments described in the specification are all preferred embodiments, and the actions and modules involved are not necessarily required by the present disclosure.

In the above embodiments, the description of each embodiment has its own emphasis. For a part that is not described in detail in one embodiment, reference may be made to related descriptions in other embodiments.

In several embodiments provided in the present disclosure, it should be understood that the disclosed device may be implemented in other ways. For example, the device embodiments described above are only schematic. For example, the division of the unit is only a logical function division. In actual implementation, there may be another division manner. For example, multiple units or components may be combined or integrated into another system. Or, some features may be ignored or not implemented. In addition, the displayed or discussed mutual coupling or direct coupling or communication connection may be indirect coupling or communication connection through some interfaces, devices or units, and may be electrical or other forms.

The units described as separate components may or may not be physically separated. The components displayed as units may or may not be physical units, that is, they may be located in one place, or may be distributed on multiple network units. Some or all of the units may be selected according to actual needs to achieve the objective of the solution of an embodiment.

In addition, each functional unit in each embodiment of the present disclosure may be integrated into one processing unit, or each unit may exist separately physically, or two or more units may be integrated into one unit. The above integrated unit may be implemented in the form of hardware or in the form of software functional unit.

When the integrated unit is implemented in the form of a software functional unit and sold or used as an independent product, it may be stored in a computer-readable memory. Based on this understanding, the technical solution of the present disclosure, essentially, or part that contributes to the existing technology, or all or part of the technical solution may be embodied in the form of a software product. The software product is stored in a memory, and includes several instructions to cause a computer device (which may be a personal computer, a server, or a network device, etc.) to perform all or part of the operations of the method described in various embodiments of the present disclosure. The memory includes: a U disk, a read-only memory (ROM), a random access memory (RAM), a mobile hard disk, a magnetic disk, an optical disk, or other media that can store program codes.

Those skilled in the art may understand that all or part of the operations in the various methods of the embodiments may be completed by a program instructing related hardware. The program may be stored in a computer-readable memory, and the memory may include a flash disk, a read-only memory, a random access device, a disk or an optical disk, etc.

The embodiments of the present disclosure have been described in detail above. Specific examples have been used herein to explain the principles and implementation of the present disclosure. The descriptions of the embodiments are only to help understand the method of the present disclosure and core ideas. Meanwhile, for those skilled in the art, specific implementation and disclosure scope may be changed according to the idea of the present disclosure. In summary, the content of this specification should not be construed as a limitation on the present disclosure.

What is claimed is:

1. A method for earphone-switching in a mobile terminal, the mobile terminal being currently connected with a first earphone, comprising:
   performing an earphone-switching operation in response to the mobile terminal being in a call state and an earphone-switching condition being met, the earphone-switching operation being configured for switching the first earphone to a second earphone such that the mobile terminal is connected with the second earphone and disconnected with the first earphone;
   detecting whether at least one of a first voice data and a second voice data is obtained during the earphone-switching operation, the first voice data being sent by a peer terminal during the earphone-switching operation, and the second voice data being collected by the mobile terminal during the earphone-switching operation; and
   sending the at least one of the first voice data and the second voice data, in response to the at least one of the first voice data and the second voice data being obtained, wherein the first voice data is sent to the second earphone, and the second voice data is sent to the peer terminal, wherein the first voice data is sent to the second earphone in response to the first voice data indicating a complete text, and wherein the complete text comprises a subject, a predicate, and an object.

2. The method according to claim 1, further comprising:
   sending a first target voice data to the second earphone in response to the first voice data indicating an incomplete text, the incomplete text comprising any one or two of a subject, a predicate, and an object, wherein the first target voice data is obtained by compensating the first voice data via a first preset voice compensation algorithm.

3. The method according to claim 1, wherein the second voice data is sent to the peer terminal in response to the second voice data indicating a complete text, the complete text comprising all of a subject, a predicate, and an object.

4. The method according to claim 3, further comprising:
   sending a second target voice data to the second earphone in response to the second voice data indicating an incomplete text, the incomplete text comprising any one or two of a subject, a predicate, and an object, wherein the second target voice data is obtained by compensating the second voice data via a second preset voice compensation algorithm.

5. The method according to claim 1, further comprising:
   buffering the at least one of the first voice data and the second voice data during the earphone-switching operation.

6. The method according to claim 1, further comprising:
   sending a first voice notification to the first earphone before the earphone-switching operation, the first voice notification being configured to notify that the earphone-switching operation is being performed in the mobile terminal; and
   sending a second voice notification to the second earphone after the earphone-switching operation, the second voice notification being configured to notify that the earphone-switching operation has been performed in the mobile terminal.

7. The method according to claim 1, wherein the earphone-switching condition being met comprises a first distance between the mobile terminal and the first earphone being greater than a second distance between the mobile terminal and the second earphone, and a third distance between the first earphone and the second earphone being greater than or equal to a first threshold.

8. The method according to claim 7, wherein the first distance between the mobile terminal and the first earphone is determined by the mobile terminal from a first received signal strength indicator (RSSI) value between the mobile terminal and the first earphone;
   the second distance between the mobile terminal and the second earphone is determined by the mobile terminal from a second RSSI value between the mobile terminal and the second earphone, and the second RSSI value is broadcast periodically from the second earphone to the mobile terminal; and
   the third distance between the first earphone and the second earphone is determined by the mobile terminal from a third RSSI value between the first earphone and the second earphone, and the third RSSI value is obtained by the first earphone and sent from the first earphone to the mobile terminal.

9. The method according to claim 1, wherein the earphone-switching condition being met comprises a first received signal strength indicator (RSSI) value being less than a preset strength-threshold, the first RSSI value indicates a strength of a signal received by the mobile terminal from the first earphone.

10. The method according to claim 1, wherein the earphone-switching condition being met comprises a remaining power of the first earphone being less than a remaining power of the second earphone, and a difference between the remaining power of the first earphone and the remaining power of the second earphone is greater than a preset power-threshold.

11. A mobile terminal, comprising a processor and a memory, wherein the memory is configured to store at least one program, when executed by the processor, causing the processor to perform:
 performing an earphone-switching operation in response to the mobile terminal being in a call state and an earphone-switching condition being met, the earphone-switching operation being configured for switching a first earphone currently connected to the mobile terminal to a second earphone such that the mobile terminal is connected with the second earphone and disconnected with the first earphone;
 detecting whether at least one of a first voice data and a second voice data is obtained during the earphone-switching operation, the first voice data being sent by a peer terminal during the earphone-switching operation, and the second voice data being collected by the mobile terminal during the earphone-switching operation; and
 sending the at least one of the first voice data and the second voice data, in response to the at least one of the first voice data and the second voice data being obtained, wherein the first voice data is sent to the second earphone, and the second voice data is sent to the peer terminal, wherein the first voice data is sent to the second earphone in response to the first voice data indicating a complete text, and wherein the complete text comprises a subject, a predicate, and an object.

12. The mobile terminal according to claim 11, wherein a first target voice data is sent to the second earphone in response to the first voice data indicating an incomplete text, the incomplete text comprising any one or two of a subject, a predicate, and an object, wherein the first target voice data is obtained by compensating the first voice data via a first preset voice compensation algorithm.

13. The mobile terminal according to claim 11, wherein the second voice data is sent to the peer terminal in response to the second voice data indicating a complete text, the complete text comprising all of a subject, a predicate, and an object.

14. The mobile terminal according to claim 13, wherein a second target voice data is sent to the second earphone in response to the second voice data indicating an incomplete text, the incomplete text comprising any one or two of a subject, a predicate, and an object, wherein the second target voice data is obtained by compensating the second voice data via a second preset voice compensation algorithm.

15. The mobile terminal according to claim 11, wherein the at least one of the first voice data and the second voice data is buffered during the earphone-switching operation.

16. The mobile terminal according to claim 11, wherein the earphone-switching condition being met comprises a first distance between the mobile terminal and the first earphone being greater than a second distance between the mobile terminal and the second earphone, and a third distance between the first earphone and the second earphone being greater than or equal to a first threshold.

17. The mobile terminal according to claim 11, wherein the earphone-switching condition being met comprises a first received signal strength indicator (RSSI) value being less than a preset strength-threshold, the first RSSI value indicates a strength of a signal received by the mobile terminal from the first earphone.

18. The mobile terminal according to claim 11, wherein the earphone-switching condition being met comprises a remaining power of the first earphone being less than a remaining power of the second earphone, and a difference between the remaining power of the first earphone and the remaining power of the second earphone is greater than a preset power-threshold.

* * * * *